Patented June 23, 1936

2,044,963

UNITED STATES PATENT OFFICE 2,044,963

WATER-SOLUBLE BASIC TRIPHENYLMETHANE DYESTUFFS AND A PROCESS OF PREPARING THEM

Paul Wolff and Wilhelm Werner, Frankfort-on-the-Main, Germany, assignors to General Aniline Works, Inc., New York, N. Y., a corporation of Delaware No Drawing. Application August 24, 1933, Serial No. 686,646. In Germany September 3, 1932

9 Claims. (Cl. 260—67)

The present invention relates to water-soluble basic triphenylmethane dyestuffs and to a process of preparing them.

We have found that easily soluble basic triphenylmethane dyestuffs of excellent fastness to light and of bright clear shades are obtainable by combining two molecular proportions of a dihydroxyalkylaminoaryl and one molecular proportion of a para-alkoxydiphenylamine or a para-alkyldiphenylamine with the methane carbon atom. This combination may be effected either by a process which comprises melting a compound of the general formula:

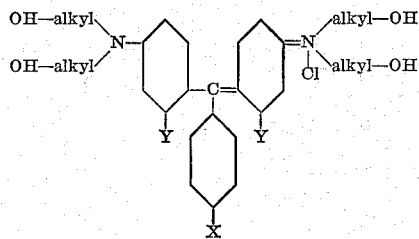

wherein X means chlorine, an alkoxy group, a sulfo group or an amino group and Y means hydrogen, alkyl or chlorine, with a compound of the general formula: NH₂-phenyl-Z wherein Z means an alkyl or an alkoxy group standing in para-position to the NH₂-group, or by condensation of a substituted or unsubstituted tetrahydroxyalkyldiaminobenzophenone with a para-alkoxydiphenylamine or a para-alkyldiphenylamine.

In any easy way there are thus obtainable new easily soluble basic triphenylmethane dyestuffs, for instance, those which correspond to the following general formula:

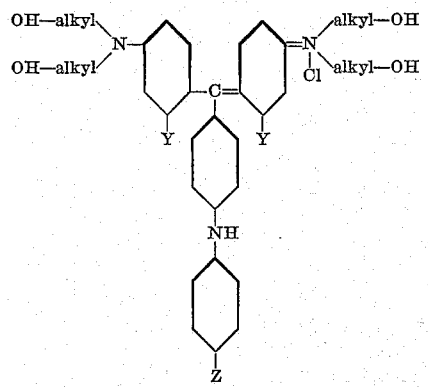

wherein Z means an alkyl or an alkoxy group and Y means hydrogen, alkyl or chlorine. The new products have an excellent fastness to light and possess bright shades which are very much in demand in the industry.

The following examples serve to illustrate the invention but they are not intended to limit it thereto, the parts being by weight:

(1) The leuco compound obtainable by sulfuric acid condensation of para-chlorbenzaldehyde with dihydroxyethylaniline is oxidized in known manner with lead peroxide to form a green dyestuff. 30 parts of this green dyestuff are melted with 40 parts of para-phenetidine at about 120° C. until the green color has disappeared. The conversion is finished after 3–4 hours. After the excess of para-phenetidine has been removed, there is obtained a very easily water soluble dyestuff which dyes tanned cotton, wool and silk bright blue tints of excellent fastness to light and which corresponds to the following formula:

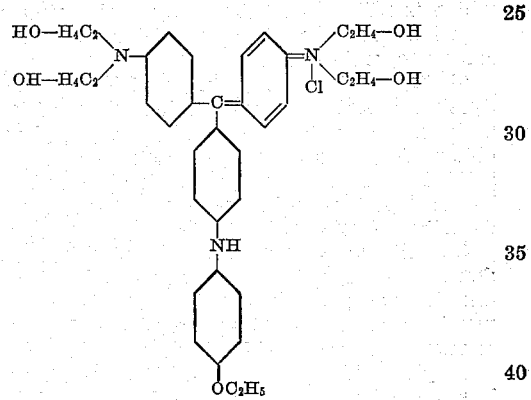

(2) By condensation of para.para'-tetrahydroxyethyldiaminobenzophenone with 4-ethoxy-diphenylamine in the presence of phosphorous oxychloride a blue dyestuff is obtained which as regards the shade, fastness to light, clearness and solubility has the same properties as the dyestuff described in Example 1.

(3) By condensation of para-chlorbenzaldehyde with dihydroxyethyl-meta-toluidine and oxidation of the leuco compound thus obtained, a yellowish green product is obtained which when melted with para-toluidine yields a blue dyestuff which is likewise very easily soluble in water and which corresponds to the following formula:

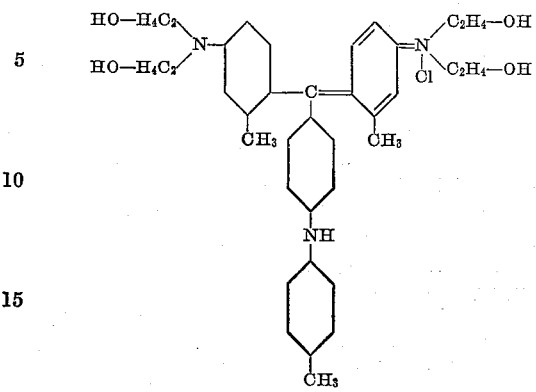

It has an essentially greener shade than that of the dyestuff described in Example 1 but shows the same fastness properties.

(4) By melting with para-phenetidine the green dyestuff of Example 3 obtainable by condensation of para-chlorbenzaldehyde with dihydroxyethyl-meta-toluidine and subsequent oxidation a blue dyestuff is obtained which corresponds to the following formula:

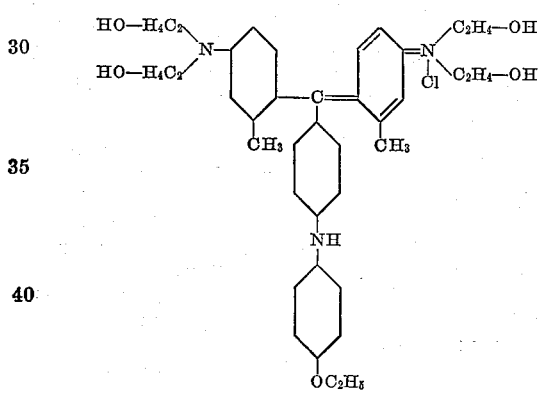

which is still somewhat more greenish than that described in Example 3 but, otherwise, has the same properties.

(5) By melting with para-phenitidine the green dyestuff obtainable by condensation of para-sulfobenzaldehyde with dihydroxyethyl-meta-chloraniline and subsequent oxidation, a water-soluble greenish blue dyestuff is obtained which has the same good fastness to light as the above described dyestuffs.

(6) The leuco compound obtainable by condensation of para-methoxybenzaldehyde with dihydroxyethyl-meta-toluidine is oxidized in the usual manner with lead peroxide. The green dyestuff thus obtainable yields when melted with para-phenetidine a greenish-blue dyestuff which has the same properties as the dyestuff obtainable according to Example 4.

We claim:

1. The process which comprises melting a compound of the general formula:

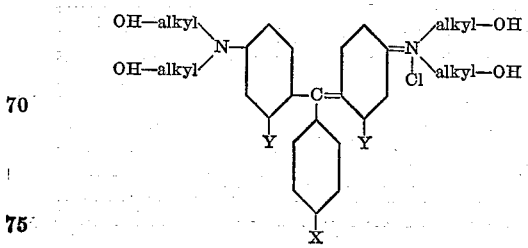

wherein X means chlorine, an alkoxy group, a sulfo group or an amino group and Y means hydrogen, alkyl or chlorine, with a compound of the general formula: NH2-phenyl-Z wherein Z means an alkyl or an alkoxy group standing in para-position to the NH2-group.

2. The process which comprises melting the compound of the formula:

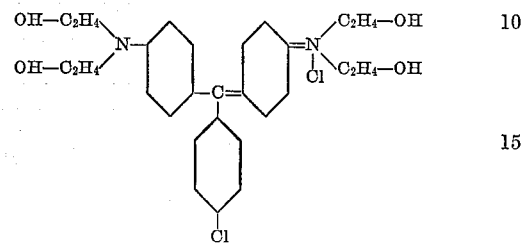

with para-phenetidine for 3 to 4 hours at a temperature of about 120° C.

3. The process which comprises melting the compound of the formula:

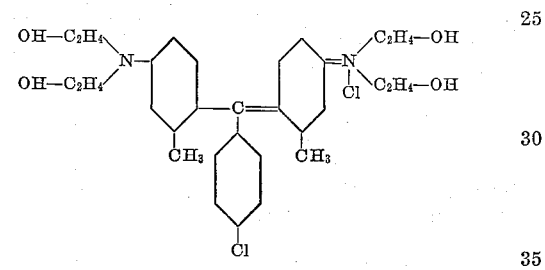

with para-toluidine for 3 to 4 hours at a temperature of about 120° C.

4. The process which comprises melting the compound of the formula:

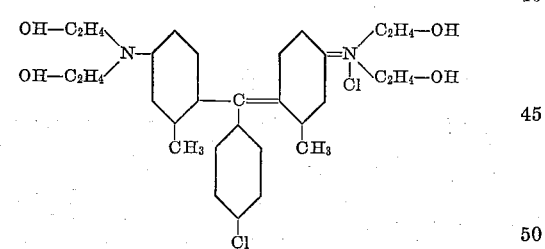

with para-phenetidine for 3 to 4 hours at a temperature of about 120° C.

5. The products of the general formula:

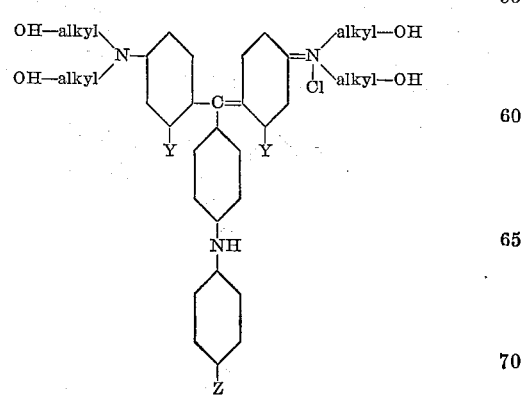

wherein Z means an alkyl or an alkoxy group and Y means hydrogen, alkyl or chlorine being very fast to light and having bright shades.

6. The product of the formula:

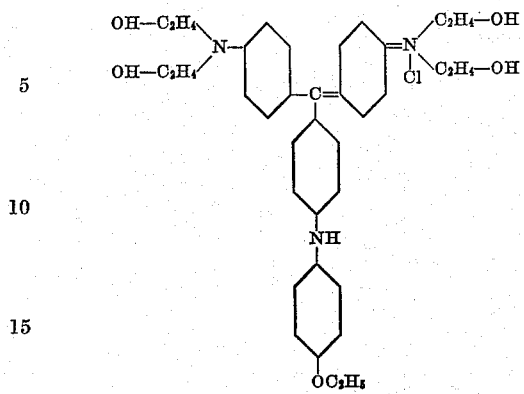

being very easily soluble in water and dyeing tanned cotton, wool and silk in bright blue shades of excellent fastness to light.

7. The product of the formula:

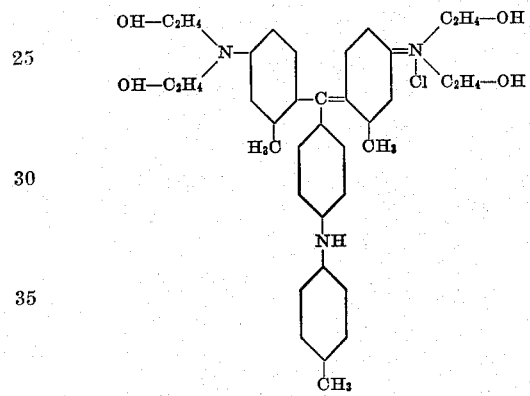

being very easily soluble in water and dyeing tanned cotton, wool and silk in bright blue shades of excellent fastness to light.

8. The product of the formula:

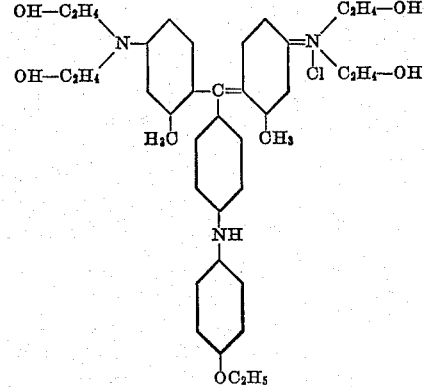

being very easily soluble in water and dyeing tanned cotton, wool and silk in bright blue shades of excellent fastness to light.

9. The process which comprises melting a compound of the general formula:

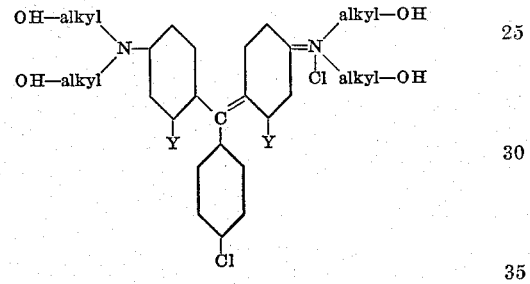

wherein Y means hydrogen, alkyl or chlorine with a compound of the general formula: $NH_2$-phenyl-Z wherein Z means an alkyl or an alkoxy group standing in para-position to the $NH_2$-group.

PAUL WOLFF.
WILHELM WERNER.